US012598147B2

(12) United States Patent
Wang et al.

(10) Patent No.:     US 12,598,147 B2
(45) Date of Patent:          Apr. 7, 2026

(54) COLLABORATIVE RELATIONAL MANAGEMENT OF NETWORK AND CLOUD-BASED RESOURCES

(71) Applicant: AT&T Intellectual Property I, L.P., Atlanta, GA (US)

(72) Inventors: Wei Wang, Harrison, NJ (US); Mikhail Istomin, Brooklyn, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 18/078,231

(22) Filed: Dec. 9, 2022

(65)         Prior Publication Data

US 2024/0195753 A1      Jun. 13, 2024

(51) Int. Cl.
*H04L 47/83*        (2022.01)
*H04L 41/16*        (2022.01)
(52) U.S. Cl.
CPC .............. *H04L 47/83* (2022.05); *H04L 41/16* (2013.01)
(58) Field of Classification Search
CPC ..... H04L 47/83; H04L 41/16; H04L 25/0254; H04L 25/03165; G06F 30/27; G06N 3/02; G06N 3/10; G06N 3/042; G06N 7/046
See application file for complete search history.

(56)           References Cited

U.S. PATENT DOCUMENTS

| | | | | |
|---|---|---|---|---|
| 10,997,409 | B1 * | 5/2021 | Krishnamurthy | ........ G06N 3/08 |
| 2002/0065697 | A1 * | 5/2002 | Cautley | .............. G06Q 10/0637 |
| | | | | 705/7.36 |
| 2007/0038494 | A1 * | 2/2007 | Kreitzberg | ............. G06Q 10/10 |
| | | | | 358/1.9 |
| 2012/0198073 | A1 * | 8/2012 | Srikanth | ................. H04L 67/10 |
| | | | | 709/226 |
| 2015/0142978 | A1 * | 5/2015 | Anderson | ............... H04L 47/83 |
| | | | | 709/226 |
| 2017/0364850 | A1 * | 12/2017 | Johnston | ........ G06Q 10/063118 |
| 2018/0082240 | A1 * | 3/2018 | Meyerzon | ......... G06F 16/24575 |
| 2019/0057338 | A1 * | 2/2019 | Botea | ............. G06Q 10/063112 |
| 2020/0160252 | A1 * | 5/2020 | Sahni | ............. G06Q 10/063112 |

(Continued)

OTHER PUBLICATIONS

Wang, X., et al., "Knowledge Graph Attention Network for Recommendation", Computer Science, Machine Learning, May 9, 2019, arXiv:1905.07854; 9 pages.

(Continued)

*Primary Examiner* — Muhammad Raza

(57)              ABSTRACT

A processing system may obtain a specification for a cloud computing project, including an identity of an organizer of the cloud computing project and at least one topic. The processing system may apply the specification as inputs to a graph neural network implemented by the processing system, the graph neural network associated with a graph having nodes associated with entities comprising: users and computing resources, the graph having edges comprising relationships between the entities, and the graph neural network configured to output a recommended set of resources for the cloud computing project. The recommended set of resources may include at least one recommended computing resource and at least one recommended participant. The processing system may then provide a notification of the recommended set of resources to the organizer and provide an initial set of computing resources for the cloud computing project in accordance with a selection of the organizer.

20 Claims, 4 Drawing Sheets

(56) References Cited

U.S. PATENT DOCUMENTS

| | | | | |
|---|---|---|---|---|
| 2020/0167717 A1* | 5/2020 | Anderson | ............. | G06F 16/248 |
| 2021/0125124 A1* | 4/2021 | Meharwade | ........... | G06N 20/00 |
| 2022/0067662 A1* | 3/2022 | Marinovic | ............. | G06Q 10/06 |
| 2022/0222305 A1* | 7/2022 | Vangala | ................. | G06F 3/0481 |
| 2022/0317985 A1* | 10/2022 | Arseneault | ................ | G06F 8/36 |
| 2022/0365756 A1* | 11/2022 | Vasireddy | ............ | G06Q 10/101 |
| 2022/0398547 A1* | 12/2022 | Wang | ................. | G06Q 10/0639 |
| 2023/0004938 A1* | 1/2023 | Teng | ..................... | G06Q 10/103 |
| 2023/0067688 A1* | 3/2023 | Pochernina | ........... | G06F 16/367 |
| 2024/0195753 A1* | 6/2024 | Wang | ...................... | H04L 41/16 |

OTHER PUBLICATIONS

Yang, Y., et al., "Multi-output Gaussian Processes for Uncertainty-aware Recommender Systems", Computer Science, Machine Learning, Jun. 8, 2021, arXiv:2106.04221v1; 10 pages.

Darban, Z.Z., et al., "GHRS: Graph-based Hybrid Recommendation System with Application to Movie Recommendation", submitted to Elsevier, arXxiv:2111.11293v2, Mar. 2022, 14 pages.

Wang, Y., et al., "A Simple Training Strategy for Graph Autoencoder", Association for Computing Machinery, ICMLC 2020, Feb. 15-17, 2020, 5 pages.

Rajamanickam, S., "Graph Neural Network (GNN) Architectures for Recommendation Systems", Towards Data Science, Sep. 16, 2021, accessed from https://towardsdatascience.com/graph-neural-network-gnn-architectures-for-recommendation-systems-7b9dd0de0856, 22 pages.

Peng, F., et al., "Multi-Output Network Combining GNN and CNN for remote Sensing Scene Classification", Remote Sensing, 2022, 14, 1478, doi.org/10.3390.rs10461478, accessed from https://www.mdpi.com/2072-4292/14/6/1478 on Dec. 5, 2022, 19 pages.

Merritt, R., "What Are Graph Neural Networks?", NVIDIA Blog, Oct. 24, 2022, 5 pages.

* cited by examiner

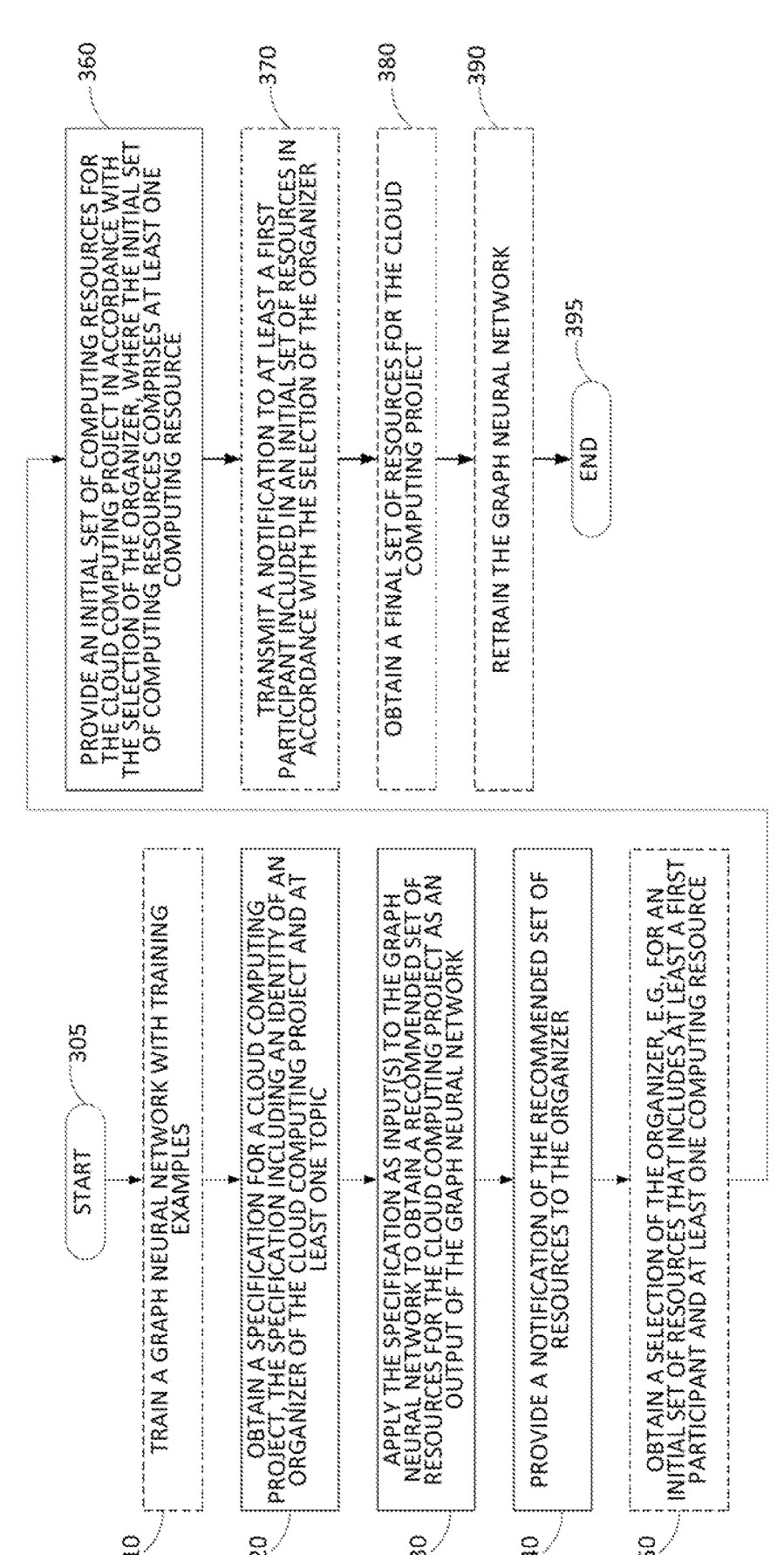

305 START

310 TRAIN A GRAPH NEURAL NETWORK WITH TRAINING EXAMPLES

320 OBTAIN A SPECIFICATION FOR A CLOUD COMPUTING PROJECT, THE SPECIFICATION INCLUDING AN IDENTITY OF AN ORGANIZER OF THE CLOUD COMPUTING PROJECT AND AT LEAST ONE TOPIC

330 APPLY THE SPECIFICATION AS INPUT(S) TO THE GRAPH NEURAL NETWORK TO OBTAIN A RECOMMENDED SET OF RESOURCES FOR THE CLOUD COMPUTING PROJECT AS AN OUTPUT OF THE GRAPH NEURAL NETWORK

340 PROVIDE A NOTIFICATION OF THE RECOMMENDED SET OF RESOURCES TO THE ORGANIZER

350 OBTAIN A SELECTION OF THE ORGANIZER, E.G., FOR AN INITIAL SET OF RESOURCES THAT INCLUDES AT LEAST A FIRST PARTICIPANT AND AT LEAST ONE COMPUTING RESOURCE

360 PROVIDE AN INITIAL SET OF COMPUTING RESOURCES FOR THE CLOUD COMPUTING PROJECT IN ACCORDANCE WITH THE SELECTION OF THE ORGANIZER, WHERE THE INITIAL SET OF COMPUTING RESOURCES COMPRISES AT LEAST ONE COMPUTING RESOURCE

370 TRANSMIT A NOTIFICATION TO AT LEAST A FIRST PARTICIPANT INCLUDED IN AN INITIAL SET OF RESOURCES IN ACCORDANCE WITH THE SELECTION OF THE ORGANIZER

380 OBTAIN A FINAL SET OF RESOURCES FOR THE CLOUD COMPUTING PROJECT

390 RETRAIN THE GRAPH NEURAL NETWORK

395 END

400

COLLABORATIVE RELATIONAL MANAGEMENT OF NETWORK AND CLOUD-BASED RESOURCES

The present disclosure relates generally to network and cloud computing, and more particularly to methods, computer-readable media, and apparatuses for providing a recommended set of computing resources for a cloud computing project using a graph neural network.

BACKGROUND

Computing resources and data are increasingly being moved into the cloud. Thus, the cloud continues to grow, with more and more applications and services added each day. Identifying and allocating the right number of resources for each project, such as storage/disk, central processing unit (CPU) and/or graphics processing unit (GPU), memory, and so forth often remain challenging.

SUMMARY

Methods, computer-readable media, and apparatuses for providing a recommended set of computing resources for a cloud computing project using a graph neural network are described. For instance, in one example, a processing system including at least one processor may obtaining a specification for a cloud computing project, the specification including an identity of an organizer of the cloud computing project and at least one topic. The processing system may next apply the specification as inputs to a graph neural network implemented by the processing system. In one example, the graph neural network may be associated with a graph having nodes associated with entities comprising: users and computing resources. In addition, the graph may have edges comprising relationships between the entities, where the graph neural network may be configured to output a recommended set of resources for the cloud computing project. In one example, the recommended set of resources may include at least one recommended computing resource and at least one recommended participant. The processing system may then provide a notification of the recommended set of resources to the organizer and provide an initial set of computing resources for the cloud computing project in accordance with a selection of the organizer.

BRIEF DESCRIPTION OF THE DRAWINGS

The teachings of the present disclosure can be readily understood by considering the following detailed description in conjunction with the accompanying drawings, in which:

FIG. 3 illustrates a flowchart of an example method for providing a recommended set of computing resources for a cloud computing project using a graph neural network.

To facilitate understanding, identical reference numerals have been used, where possible, to designate identical elements that are common to the figures.

DETAILED DESCRIPTION

Figure 1:
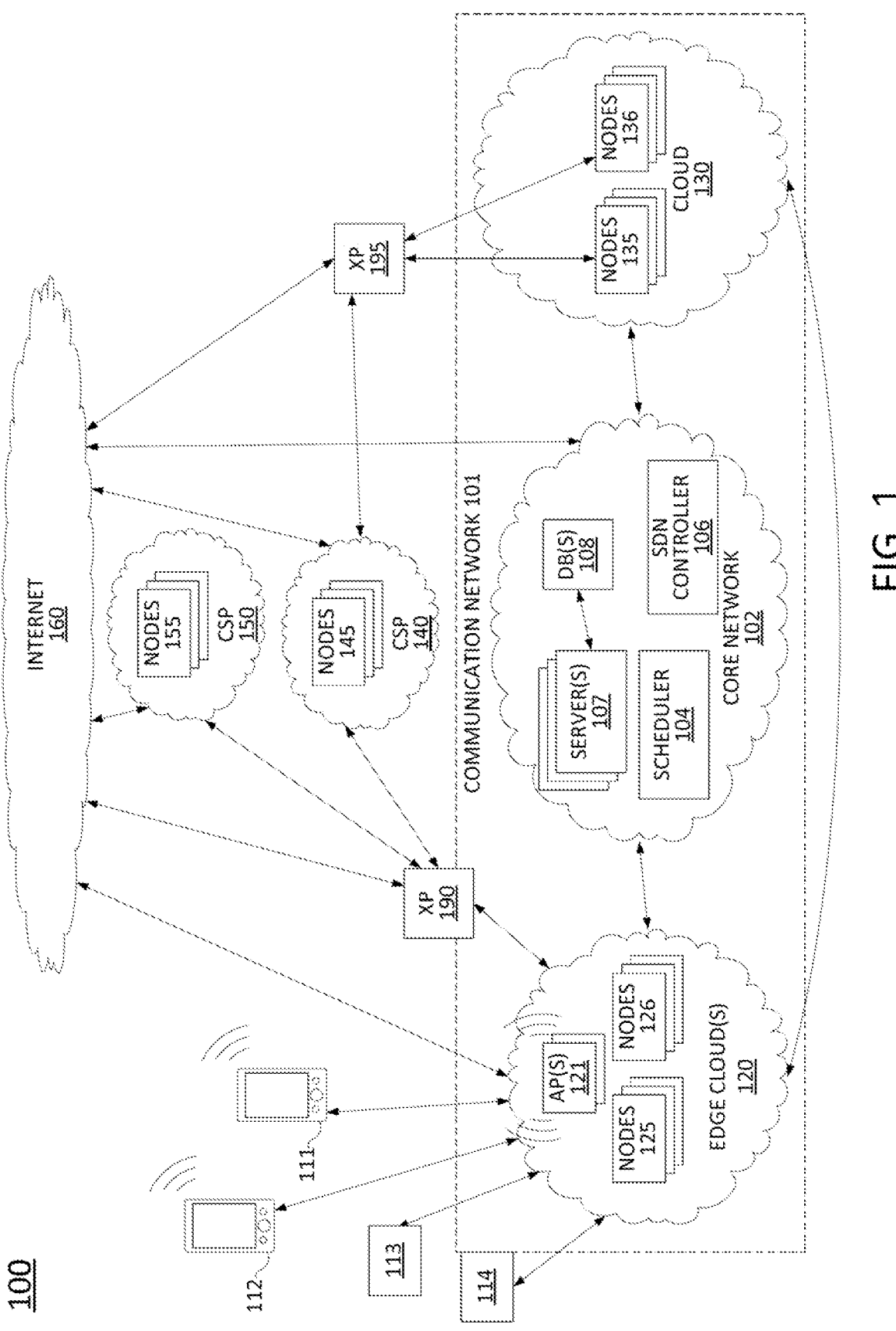
FIG. 1 illustrates an example network related to the present disclosure.

Computing resources and data are increasingly being moved into the cloud. Thus, the cloud continues to grow, with more and more applications and services added each day. Identifying and allocating the right number of resources for each project, such as storage/disk, central processing unit (CPU) and/or graphics processing unit (GPU), memory, and so forth often remain challenging. Connecting the correct data and files to these hardware resources adds further to the complexity. The principle of least privilege provides a goal of providing a level of access to data so that it is just enough to complete a current task, and no more. Reserving resources for cloud-based projects relies on human judgement and manual configuration of the environment, which can be costly in terms of money and time. In addition, the selected resources may be inaccurate, either overestimating or underestimating the need. To illustrate, current approaches to cloud resource management may include: 1) planning the project and requirements, 2) getting to know data sources needed, 3) putting together a group of people to work on the data, 4) depending on roles of the users, granting access to specific resources, 5) selecting the right amount of disk space, CPU, GPU, etc. to support computation, 6) allocating the resources, and so forth.

Examples of the present disclosure provide for an artificial intelligence (AI)/machine learning (ML)-based recommendation of resources for a cloud computing project based on user identities and their roles, the tasks, processes, or applications available as cloud services, and available hardware resources such as database servers, CPUs and/or GPUs, memory, storage, etc. In particular, examples of the present disclosure leverage the unique interaction/collaboration experience among users, allocation of users and resources, as well as metadata for all entities. As such, examples of the present disclosure learn over time and provide recommendations of allocations of resources for cloud computing projects. With this approach, users, projects, applications, data sources, and hardware resources can be represented by their profiles and features using associated metadata. For instance, in one example, users may have features such as roles, departments, skills, etc. Applications can be characterized by: goals, scope, and data/resource requirements. Hardware resources can be represented as specifications and capacity. Thus, each resource that may be involved in a cloud computing project can be represented by such metadata. It should be noted that as referred to herein, a cloud computing project may comprise a project that involves network-based hardware and/or software resources, e.g., utilizing shared hardware in one or more data centers that can be allocated to different users or groups and remotely accessed, and which can be configured by such users or groups for a variety of different purposes.

Relational or social information can also be used, such as which users have been working together on previous projects in the past, what resources have been previously allocated to what projects or applications. Such relational or social information can help determine similarity and correlation between users as well as between topics, hardware and software resources, and so forth. Using this information, new recommendations can be made using ML/AI models, such as graph neural networks (GNN) and multimodal learning algorithms, which may combine the metadata of the entities involved in cloud computing project, along with their relationships to infer what resources are appropriate for a new cloud computing project during the setup process.

It should be noted that current cloud solutions may provide generic project templates, which require additional manual customization to fit specific project needs. In contrast, examples of the present disclosure provide unique recommendations for each cloud computing project based on specifications provided by an organizer/requester, leveraging accumulated information/knowledge about previous similar projects and resources used by requestor's other projects. In one example, the accumulated knowledge may be stored in a graph database format, which captures significant information about relationships among entities (e.g., users, computing resources, and/or topics that have been involved together in past projects). The end result may comprise a specialized template, presented to project organizer for review, or set of additional recommendations for resource and architecture to be added to a generic template. In addition, the accuracy of the recommendations for sets of resources may improve over time with more projects being completed and the knowledge is added back, e.g., to a graph database. These and other aspects of the present disclosure are described in greater detail below in connection with the examples of FIGS. 1-4.

To aid in understanding the present disclosure, FIG. 1 illustrates an example system 100 in which examples of the present disclosure may operate. The system 100 may include any one or more types of networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VOIP) networks, Service over IP (SoIP) networks, and the like.

In one example, the system 100 may include a communication network 101. The communication network 101 may comprise a core network 102. The core network 102 may be in communication with one or more edge cloud(s) 120, cloud 130, and the Internet 160. In one example, core network 102 may combine core network components of a cellular network with components of a triple play service network; where triple-play services include telephone services, data/Internet services, television services, and/or other communication services to subscribers. For example, core network 102 may functionally comprise a fixed mobile convergence (FMC) network, e.g., an IP Multimedia Subsystem (IMS) network. In addition, core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 102 may further comprise a broadcast television network, e.g., a traditional cable provider network or an Internet Protocol Television (IPTV) network, as well as an Internet Service Provider (ISP) network. In one example, core network 102 may include a plurality of video servers (e.g., a broadcast server, a cable head-end), a plurality of content servers, an advertising server (AS), an interactive TV/video on demand (VoD) server, and so forth. For ease of illustration, various additional elements of network 102 are omitted from FIG. 1.

Cloud 130 may comprise networked computing resources for communication network 101 to provide cloud services to subscribers/customers and/or for internal purposes, such as for cloud computing projects of network personnel. For instance, cloud 130 may include nodes 135 and 136 which may comprise hardware computing resources in one or more data centers, such as central processing units (CPUs), graphics processing units (GPUs), memory, storage devices, line cards, and so forth. The computing resources may operate as servers for hosting virtual machines, containers, microservices, or the like providing various applications, may operate as storage systems for storing databases, data tables, graphs, and so on, may operate to train and/or test machine learning models, or may host trained machine learning models for performing various run-time services (e.g., for natural language processing, network anomaly detection, object detection/recognition, weather forecasting, traffic forecasting/prediction, route planning, and so forth).

In one example, the edge cloud(s) 120 may comprise access networks. For instance, in an illustrative example, one or more of edge cloud(s) 120 may comprise cellular/ wireless access networks, e.g., radio access networks (RANs), such as a Universal Terrestrial Radio Access Network (UTRAN), an evolved UTRAN (eUTRAN), or the like. In such an example, the communication network 101 may comprise an LTE network, and the core network 102 may comprise an Evolved Packet Core (EPC) network, for instance. However, in other, further, and different examples, any one or more of edge cloud(s) 120 may alternatively or additional comprise a Digital Subscriber Line (DSL) network, a broadband cable access network, a (non-cellular) wireless access networks (e.g., an Institute for Electrical and Electronics Engineers (IEEE) 802.11/Wi-Fi network and the like), and so forth. For example, the operator of communication network 101 may provide a cable television service, an IPTV service, or any other types of telecommunication service to subscribers via the communication network 101.

In one example, the edge cloud(s) 120 may be in communication with one or more devices 111-114, e.g., endpoint devices or user equipment (UE). The devices 111-114 may be associated with various user/participants engaging in cloud computing projects in accordance with the present disclosure. Edge cloud(s) 120 may transmit and receive communications between devices 111-114, between devices 111-114 and scheduler 104, server(s) 107, or other components of core network 102, between devices 111-114 and nodes 125, 126, 135, and 136 (e.g., agent nodes, or host devices, as described in greater detail below), devices reachable via the Internet in general, and so forth. To illustrate, the edge cloud(s) 120 may comprise one or more access networks as described above. For instance, as illustrated in FIG. 1, the edge cloud(s) 120 may include one or more access points (APs) 121, that may communicate wirelessly with devices 111 and 112 and that may interface with other devices in the respective edge cloud(s) 120, in the core network 102, over the Internet in general, and so on. Each of the APs 121 may comprise a cellular base station, such as a base transceiver station (BTS), a NodeB or an evolved NodeB (eNodeB or eNB), a pico eNB (PeNB), e.g., of a pico cell, a home eNB (HeNB), e.g., of a femto cell, a noncellular AP, e.g., a IEEE 802.11 wireless router/AP, and so on.

In one example, each of the devices 111-114 may comprise any single device or combination of devices that may comprise a user endpoint device, or client device. For example, the devices 111-114 may each comprise a mobile device, a cellular smart phone, a laptop, a tablet computer, a desktop computer, an application server, a bank or cluster of such devices, and the like. In one example, any one or more of the devices 111-114 may comprise AR devices such as heads-up displays, wearable or non-wearable optical see-through or video see-through devices, handheld computing devices with at least a camera and a display, and so forth.

As mentioned above, edge cloud(s) 120 may include a plurality of nodes, e.g., nodes 125, 126, etc. The nodes 125 and 126 may comprise host devices, e.g., computing resources comprising processors, e.g., central processing units (CPUs), graphics processing units (GPUs), programmable logic devices (PLDs), such as field programmable gate arrays (FPGAs), or the like, memory, storage, and so forth. In an example where the edge cloud(s) 120 comprises radio access networks, the nodes 125 and 126, and other components of the respective edge cloud(s) 120 may be referred to as mobile edge infrastructure. The nodes 125 and 126 may comprise servers hosting virtualization platforms for managing one or more virtual machines (VMs), containers, microservices, or the like.

In one example, the nodes 125 and 126 may comprise components of and/or be collocated with the respective AP(s) 121. Alternatively, or in addition, any one or more of the nodes 125 and 126 may be a component of and/or be collocated with an aggregation point (not shown) that may service multiple access points, e.g., a plurality of base stations. Similarly, any one or more of the nodes 125 and 126 may be a component of and/or be collocated with a radio network controller (RNC) of a respective one of the edge cloud(s) 120.

In accordance with the present disclosure, the nodes 125 and 126 in edge cloud(s) 120 and nodes 135 and 136 in cloud 130 may be made available to host client services and may be managed and coordinated by scheduler 104. For instance, in one example, the nodes 125, 126, 135, and 136 may be configured to receive and respond to requests for availability from scheduler 104, to provide offers to host client services, to respond to instructions from scheduler 104 to host client services, to obtain images, codes, application data, media content, and other data to instantiate and host a client service from scheduler 104 or from one or more network-based repositories storing such data, to respond to instructions from scheduler 104 to release client services, and so forth. In one example, communication network 101 may provide a service for hosting client services on cloud infrastructure to subscribers, e.g., in addition to phone, video, and/or other telecommunication services. The clients may comprise individuals or may comprise enterprises, such as a content distribution network (CDN), a video streaming provider, a gaming service provider, or other application providers, or personnel of communication network 101 itself. In addition, the nodes 125, 126, 135, and 136 may be configured to interact with other computing resources external to the respective edge clouds 120 and 130, such as with nodes 145 and nodes 155 of cloud service providers (CSPs) 140 and 150, respectively, as well as with endpoint devices/UE, such as devices 111-114, in connection with the client service(s) instantiated thereon.

In one example, the nodes 125, 126, 135, and 136 may also comprise network function virtualization infrastructure (NFVI), e.g., for software defined network (SDN) services of an operator of the core network 102 and/or the communication network 101 in general, such as virtual mobility management entities (vMMEs), virtual serving gateways (vSGWs), virtual packet data network gateways (vPDNGWs or VPGWs) or other virtual network functions (VNFs). In such an example, the service provider VNFs may be logically separated from any client services which may be allowed to be instantiated on the same mobile edge infrastructure. In another example, nodes hosting client services may be collocated with, but physically separate from any servers which may comprise NFVI for service provider functions/VNFs. For instance, nodes 125 and 135 may be reserved for client services, while nodes 126 and 136 may be reserved for service provider functions/VNFs.

In such an example, the nodes 126 and 136, and the VNFs instantiated thereon, may be controlled and/or managed by the SDN controller 106. For instance, in one example, SDN controller 106 is responsible for such functions as provisioning and releasing instantiations of VNFs to perform the functions of routers, switches, and other devices, provisioning routing tables and other operating parameters for the VNFs, and so forth. In one example, SDN controller 106 may maintain communications with VNFs and/or host devices/NFVI (e.g., nodes 126 and 136) via a number of control links which may comprise secure tunnels for signaling communications over an underling IP infrastructure of network 105. In other words, the control links may comprise virtual links multiplexed with transmission traffic and other data traversing communication network 101 and carried over a shared set of physical links. For ease of illustration the control links are omitted from FIG. 1. In one example, the SDN controller 106 may also comprise a virtual machine operating on NFVI/host device(s), or may comprise a dedicated device.

In one example, each of the nodes 125, 126, 135, 136, 145, and 155 may comprise a computing system or server, such as computing system 400 depicted in FIG. 4, and may be configured to provide one or more operations or functions in connection with examples of the present disclosure for providing a recommended set of computing resources for a cloud computing project using a graph neural network, as described herein (such as illustrated and described in connection with the example method 300 of FIG. 3). In addition, each of the scheduler 104 and SDN controller 106 may comprise a computing system or server, such as computing system 400 depicted in FIG. 4, or one or more instances of such a computing system or server, and may be individually or collectively configured to provide one or more operations or functions in connection with examples of the present disclosure for providing a recommended set of computing resources for a cloud computing project using a graph neural network.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

As further illustrated in FIG. 1, the system 100 includes cloud service providers (CSPs) 140 and 150, which may each comprise networked computing resources for providing cloud services directly on behalf of the CSPs 140 and 150 and/or for third parties having project development environments, data storage, and/or applications/services hosted via CSP 140 and/or CSP 150. For instance, CSP 140 and CSP 150 may comprise public or private cloud computing resources in one or more data centers, such as central processing units (CPUs), graphics processing units (GPUs), memory, storage devices, and so forth. The computing resources may operate as servers for hosting virtual machines, containers, microservices, or the like providing various applications, may operate as storage systems for storing databases, data tables, graphs, and so on. In one example, CSP 140 or CSP 150 may comprise a content distribution network (CDN) or at least a portion thereof.

As illustrated in FIG. 1, the system 100 further includes an exchange points (XPs) 190 and 195. In accordance with the present disclosure, an XP, e.g., an Internet exchange point (IXP), may interconnect one or more communication networks and one or more cloud service providers. For instance, XPs 190 and 195 may interconnect communication network 101 (and more specifically edge cloud(s) 120 and cloud 130), cloud service provider (CSP) 140 and CSP 150, and the Internet 160. In one example, XP 190 may comprise a localized IXP, which may be referred to as an edge exchange point (EXP) (e.g., providing the same or similar functions and having the same or similar components as an IXP, but at a more limited scale and with greater proximity between the communication network and cloud service provider infrastructure, and with greater proximity to end user's devices, e.g., devices 111-114 in the example of FIG. 1). In accordance with the present disclosure, an EXP may be provided by a communication network, or may be provided by a third party. Thus, for example, XP 190 may be provided by communication network 101 and may be a component of edge cloud(s) 120 and/or of the communication network 101 in general. For illustrative purposes, XP 195 may be deployed and operated by a third party (e.g., not the communication network 101, CSP 140, or CSP 150).

In one example, system 100 may include communication links between edge cloud(s) 120 and cloud 130 which bypass the core network 102. As just one example, APs 121 may provide a wireless mesh connectivity for devices to access core network 102, where the mesh connectivity may also be used to provide access to resources/infrastructure in cloud 130 via edge cloud(s) 120, without transiting via core network 102. Alternatively, or in addition, the edge cloud(s) 120 and cloud 130 may be interconnected via physical links, e.g., fiber optic cable(s), or the like, which may similarly provide access to mobile edge infrastructure for devices that do not necessarily connect via an access point of the respective edge cloud. Thus, for example, the device 112 may establish a session with one of the nodes 135 that may include a wireless link between device 112 and one of the AP(s) 121, and a fiber link or the like between edge cloud 120 and cloud 130.

As further illustrated in FIG. 1, core network 102 may further include one or more server(s) 107 and one or more databases (DB(s)) 108. In accordance with the present disclosure, each of the server(s) 107 may comprise a computing system or server, such as computing system 400 depicted in FIG. 4, and may individually or collectively be configured to perform operations or functions for providing a recommended set of computing resources for a cloud computing project using a graph neural network. It should be noted that any number of server(s) 107 or database(s) 108 may be deployed. In one example, server(s) 107 may train one or more machine learning models (MLMs) in accordance with the present disclosure. Specifically, server(s) 107 may train a graph neural network (GNN) to output recommended resources for a cloud computing project, as described herein. For instance, server(s) 107 may receive specifications for cloud computing projects and may apply the specifications to the GNN that is configured to output recommended resources based upon the specifications. For instance, a specification may include an identity of a project organizer (e.g., a user of one of the devices 111-114) and one or more topics. The specification may optionally include fixed parameters comprising identities of one or more other participants (e.g., a different one or more of the users of the devices 111-114), computing resources that the organizer has indicated are to be used for the project (e.g., any of the nodes 125, 126, 135, 136, 145, and/or 155, and/or any one or more components thereof (for example CPU/GPU resources from one node may be used for a given project, while the memory of such node is not used for such project, or may be used for other projects/clients)), non-hardware capacity/provisioning (such as peak and average bandwidth allotments, etc.), software, programs, applications, data sets, or other non-hardware computing resources, and so forth. For example, a project organizer may designate that computing resources, e.g., nodes and/or components thereof, of CSP 150 are to be used for the project. The output of the GNN may be a recommended set of resources comprising at least one recommended participant (e.g., a different one or more of the users of the devices 111-114 other than the organizer) and at least one recommended computing resource (e.g., hardware resources comprising any of nodes 125, 126, 135, 136, 145, and/or 155, and/or any one or more components thereof and/or non-hardware computing resources, such as capacity provisioning and/or software resources).

It should be noted that insofar as the nodes 125, 126, 135, 136, 145, and/or 155 may have the same or similar components, in one example, the recommended computing resources may not identify specific nodes, but may identify the type(s) of computing resources (or sub-components thereof) that is/are recommended, e.g., where the scheduler 104 may find available nodes that have the recommended resources and which can be allocated to the project. It should also be noted that in some cases, the recommended resources may include computing resources in specific clouds (e.g., cloud 130, edge cloud 120, CSP 140 or 150, etc.). For instance, for a project that involves machine learning model training, it may be learned from prior projects that nodes 145 of CSP 140 may be preferred, which may be due to a lower cost, or other factors, such as availability of GPUs which may speed the model training time. As such, the recommended set of resources may include an identification of "GPUs of CSP 140" rather than the broader category of "GPUs." Similarly, nodes 125 and/or 126 of edge cloud(s) 120 may be recommended for applications which may benefit from edge interconnection between a communication network and a cloud service provider, such as applications requiring low latency or which may have high data/bandwidth requirements, e.g., streaming video, augmented reality, virtual reality, 360 video, volumetric video, video gaming, or other immersive visual streaming services (which may include audio streaming in addition to visual data), audio streaming services, virtual assistants, translation services, security services (e.g., object tracking, facial recognition, etc.), and so on.

In one example, DB(s) 108 may comprise one or more physical storage devices integrated with server(s) 107 (e.g., a database server), attached or coupled to the server(s) 107, or remotely accessible to server(s) 107 to store various types of information in accordance with the present disclosure. For example, DB(s) 108 may store training data for training a GNN. To illustrate, DB(s) 108 may store records of completed projects, where each record may include: an identity of a project organizer, the topic(s) of the project, the actual participants, and the actual computing resources used. Such data may be used as training data by server(s) 107 for training the GNN. In one example, as recommended sets of resources are generated for new projects and as such projects come to completion, discrepancies between the recommended sets of resources and the actual sets of resources used may be detected and used to retrain the GNN. In addition, DB(s) 108 may store a graph database that may be used or may comprise part of the GNN. For instance, the records of past projects may also be used to update a graph database that records the relationships between various entities (users and computing resources, and in one example also including topics).

It should be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like, additional edge clouds, and so forth. Thus, these and other modifications are all contemplated within the scope of the present disclosure.

Figure 2:
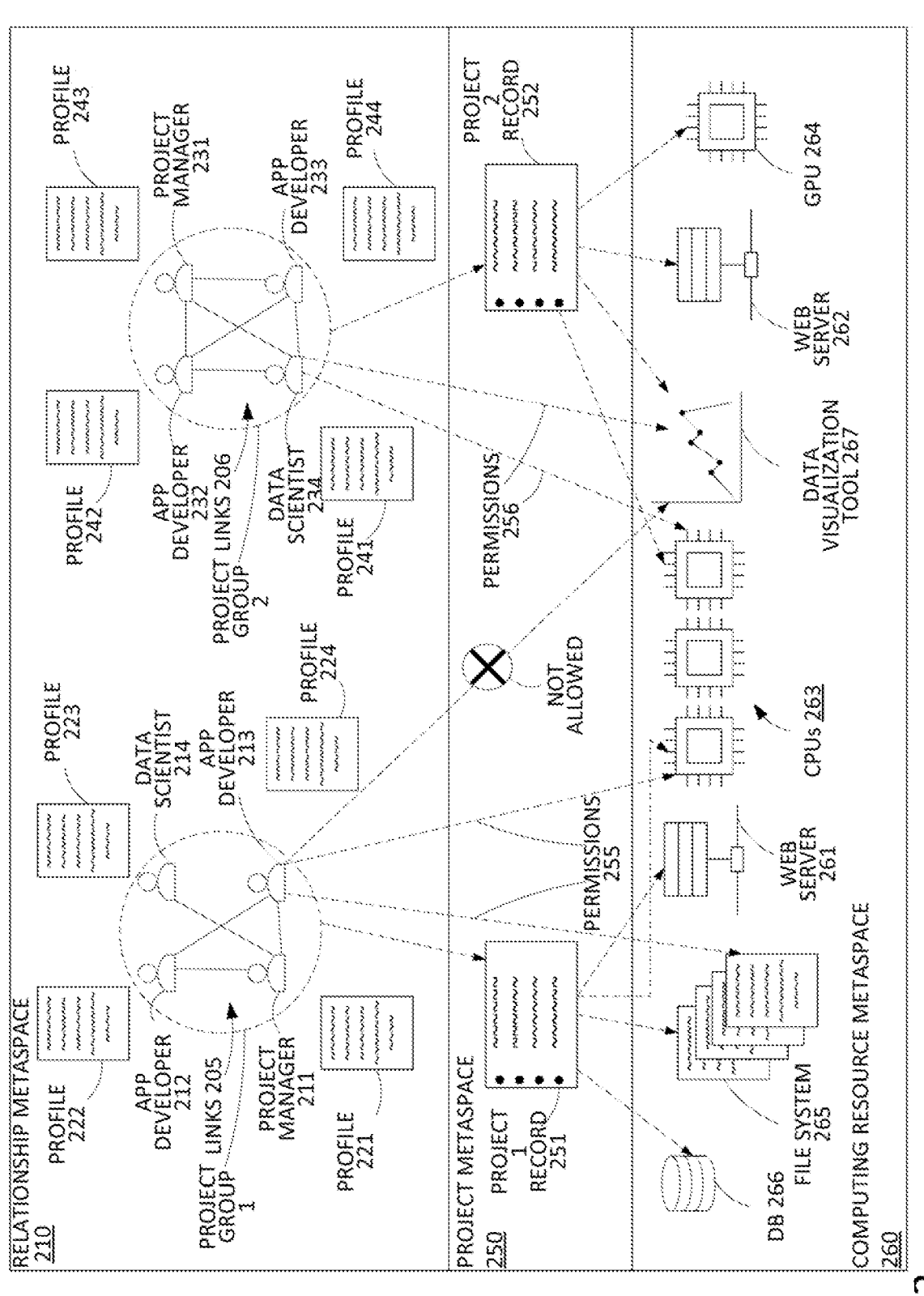
FIG. 2 illustrates an example of relationships among users, projects, and computing resources, in accordance with the present disclosure.

FIG. 2 illustrates an example 200 of relationships among users, projects, and computing resources, in accordance with the present disclosure. In the example 200, there is a relationship metaspace 210, a project metaspace 250, and a computing resource metaspace 260. Since FIG. 2 is not intended to be a limiting representation, the example 200 is only illustrative of a graph database that may be associated with a GNN as described herein. The relationship metaspace 210 indicates relationships among users (e.g., links 205 and 206). In the example 200 of FIG. 2, project manager 211, application (app) developers 212 and 213, and data scientist 214 may form a group of users (project group 1) collaborating on project 1. The links 205 indicate more specific relationships among these users. For instance, data scientist 214 may only interact with project manager 211, while app developers 212 and 213 interact with each other and with project manager 211. Similarly, project group 2 may include project manager 231, app developers 232 and 233, and data scientist 234 collaborating on project 2. The links 206 illustrate that project group 2 has somewhat different relationships among the group members/users. In the present example, each of the users has a respective profile 221-224, 241-244. Each of these profiles may include: projects the user has worked on/is working on, the computing resources the user has worked with/is working with, and other users who the user has worked with/is working with. Alternatively, or in addition, each of the profiles 221-224, 241-244 may indicate topics associated with the respective user, skills of the user, roles/title(s) of the user, and so forth.

In one example, the project metaspace 250 may include records of completed projects. In one example, the project metaspace 250 may further include records of ongoing/current projects, such as projects 1 and 2 (e.g., records 251 and 252). These records may include information on: the project organizer, the topic(s) of the project, the participants/users involved, the roles of such participants, and the computing resources utilized (e.g., hardware resources, non-hardware capacity, software resource, and so forth). In the present example 200, the project managers 211 and 231 may be the respective project organizers. However, in other examples, a project manager may be different from the organizer.

FIG. 2 further illustrates various computing resources in computing resource metaspace 260, which may include web servers 261 and 262, CPUs 263, GPU 264, file system 265, DB 266, data visualization tool 267, and so forth. In the example, 200, project 1 may involve the use of DB 266, file system 265, web server 261, and one of the CPUs 263, while project 2 may involve the use of one of CPUs 263, data visualization tool 267, web server 262, and GPU 264 (e.g., indicated by the connecting arrowed lines). FIG. 2 further illustrates specific permissions 255 and 266 of app developer 213 and data scientist 234, respectively. For instance, although project 1 involves DB 266, file system 265, web server 261, and one of the CPUs 263, the app developer 213 may only utilize the file system 265 and one of the CPUs 263. As further illustrated in FIG. 2, app developer 213 is specifically not allowed to access the data visualization tool 267. In one example, app developer 213 is also not allowed to access DB 266 and web server 261, even though these are assigned to project 1 in which the app developer 213 is a participant. However, in another example, there may simply be no direct link between app developer 213 and these computing resources where the app developer does not personally use these resources. Similarly, data scientist 234 is permitted to access and may therefore utilize one of the CPUs 263 and the data visualization tool 267 during the course of project 2.

It should be noted that in the example 200, there may be some overlap between the profiles 221-224, 241-244, the project records, the links 205, and so forth. For instance, the example 200 may represent part of a graph database that includes nodes for various entities (e.g., users/participants, computing resources, topics, etc.). The links 205 illustrate relationships among some of the users/participants. However, the same information may also be included in the respective profiles 221-224. It should also be noted that in one example, projects may be represented by nodes in a graph database, which may have metadata/properties such as contained in records 251 and 252. However, in another example, these records may be maintained separately, while collaboration on specific projects among users may still be captured in the profiles 221-224, 241-244. In still another example, computing resources may also have profiles/metadata that may indicate the users who have used such computing resources, the other computing resources that may have been used in connection with a given computing resource, and so forth. Alternatively, or in addition, the same or similar information may be captured in links between computing resource nodes in such a graph database. In this regard, it should also be noted that the graph database may comprise a multi-partite/k-partite graph, e.g., relationships/links/edges that are between users and projects, and between projects and resources. For instance, any user-to-user relationship is captured by each having an edge to the same project (and/or topic) and likewise for user-to-computing resource relationships, and computing resource-computing resource relationships. However, in another example, the graph database may comprise a heterogeneous graph with complex structure and numerous permitted relationships/links/edges between nodes/entities of the same type and of different types. For instance, the example 200 partially illustrates such complexity, where app developer 213 has individual links to specific computing resources, while the project 1 record 251 also includes links to computing resources utilized for project 1. Similarly, users having direct relationships are indicated by links 205 and 206. Thus, it should be understood that the example of FIG. 2 is illustrative in nature, and that in other, further, and different examples, a graph database may have a variety of different structures, rules, and so forth that may capture the relationships among users, computing resources, topics, and/or projects that may be used in training a graph neural network and for making recommendations for sets of resources for additional cloud computing projects.

It should be noted that a graph neural network (GNN) is associated with or includes a graph, or graph database that includes nodes and edges representing relationships. In general, a GNN may use embeddings to capture information in each node about its neighbors (e.g., 1 hop, 2 hops, etc.) and upon which a predictive model (or prediction model) may be trained. In this regard, GNNs may include variants such as graph convolutional network (GCNs), graph attention networks (GATs), graph autoencoders, knowledge graph attention networks (KGATs), and so forth. In one example, the present disclosure may utilize a multi-output GNN, e.g., a multi-class GNN.

It should be noted that as referred to herein, a prediction model may include a machine learning model (MLM) (or machine learning-based model), e.g., a machine learning algorithm (MLA) that has been "trained" or configured in accordance with input data (e.g., training data) to perform a particular service, e.g., to identify resources to be used in connection with a cloud computing project based upon a specification for the cloud computing project that includes at least: an identify of an organizer and at least one topic, and so forth. Examples of the present disclosure may incorporate various types of MLAs/models that utilize training data, such as support vector machines (SVMs), e.g., linear or non-linear binary classifiers, multi-class classifiers, deep learning algorithms/models, such as deep learning neural networks or deep neural networks (DNNs), generative adversarial networks (GANs), decision tree algorithms/models, k-nearest neighbor (KNN) clustering algorithms/models, and so forth. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. In one example, an MLMs of the present disclosure may be in accordance with a MLA/MLM template from an open source library, such as OpenCV, which may be further enhanced with domain specific training data.

As described above, the present disclosure may implement a graph neural network (GNN) that may use a graph/graph database to store information about entities and their relationships, and which may use a predictive model such as a CNN, an autoencoder, and so forth to generate predictions of resources that are recommended to be used in connection with a subject cloud computing projected based on a specification that includes at least: an organizer identity and at least one topic. In one example, the prediction model may use node embedding and/or graph embeddings as inputs. For instance, node embeddings may consider nodes within 2-3 hops of the organizer and/or the topic, or the like. In one example, graph embeddings may also be used based on the organizer and/or the topic (e.g., a sub graph). For instance, a graph embedding may be generated via a graph2vec algorithm, or the like. These node embedding(s) and/or graph embedding(s) may then be applied as inputs to a prediction model (e.g., along with a candidate node representing a potential resource to include in the set of recommended resources). An output of the prediction model may be a score/value for the node indicating whether the node is recommended (e.g., if over a threshold value/score) or not. As noted above, the prediction model may be a convolutional neural network (CNN) (e.g., GCN), an autoencoder, and so forth. In one example, additional sets of inputs may be applied to the prediction model for a plurality of candidate nodes, e.g., within 1-2 hops of the organizer and/or the topic, to obtain respective scores/values. In one example, the recommendation may include a list of resources, e.g., nodes, for which respective scores/values exceed a first threshold. In one example, the actual score may also be provided. In one example, the list may further include additional resources/nodes that do not exceed the threshold, but which may be relevant to present to the organizer, e.g., in a box below the actual recommended resources. In one example, the graph embedding and/or the node embedding process may be trained as part of a prediction model or may be trained separately from the prediction model.

FIG. 3 illustrates a flowchart of an example method 300 for providing a recommended set of computing resources for a cloud computing project using a graph neural network, in accordance with the present disclosure. In one example, the method 300 is performed by a component of the system 100 of FIG. 1, such as by one or more of server(s) 107, or one or more components thereof (e.g., a processor, or processors, performing operations stored in and loaded from a memory), or by server(s) 107 in conjunction with one or more other entities, such as DB(s) 108, scheduler 104, SDN controller 106 nodes 125, 126, 135, 136, 145, and/or 155, and so forth. In one example, the steps, functions, or operations of method 300 may be performed by a computing device or system 400, and/or processor 402 as described in connection with FIG. 4 below. For instance, the computing device or system 400 may represent any one or more components of a cloud service provider in FIG. 1 that is/are configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or processing system 400 may collectively function as a processing system. For illustrative purposes, the method 300 is described in greater detail below in connection with an example performed by a processing system. The method 300 begins in step 305 and may proceed to optional step 310 or to step 320.

At optional step 310, the processing system may train a graph neural network with training examples. For instance, the training examples may include records of completed cloud computing projects, where the records include final sets of resources used for the completed cloud computing projects. It should be noted that the final sets of resources may not be the recommended or initial sets of resources for the respective completed projects. For example, the initial organizer selection and/or recommendation via the graph neural network may have been inaccurate, or the project parameters may have changed. In one example, each of the records may further include information comprising: an identity of a respective project organizer of a respective completed cloud computing project and one or more topics of the respective completed cloud computing project. In one example, the training of optional step 310 may also include testing, e.g., for accuracy of the graph neural network predictions and continuing to train until the accuracy is improved, and so forth.

In one example, the graph neural network is associated with a graph (or "graph database") having nodes associated with entities comprising: users and computing resources. In one example, the entities may further comprise topics that include the at least one topic included in the specification. However, in another example topics alternatively or additionally may be part of the node profiles/metadata (e.g., users and computing resources may be associated with different topics, and can have values/scores for different topics based on the prevalence of association of the user or computing resource for projects involving each topic). The graph may further have edges comprising relationships between the entities (e.g., between users, between users and computing resources, between users and topics, and/or between computing resources and topics). In addition, the graph neural network may be configured to output a recommended set of resources for a cloud computing project, where the recommended set of resources includes at least one recommended computing resource and at least one recommended participant. For instance, the computing resources may include a hardware resource, a non-hardware capacity, or a software resource. To illustrate, hardware resources may include CPUs, GPUs, memory, storage, line cards, etc. Non-hardware capacity can be peak and average bandwidth allotments, etc. A software resource can be software for a particular web-server, firewall, routing engine, load balancer, transcoding server, a translation service/application, a particular graphical user interface (GUI) or the like, a template for a website, document templates, etc. Software resources may also include containers and/or VMs operating on hardware, operating system (OS) software, and so forth.

At step 320 the processing system obtains a specification for a cloud computing project, the specification including an identity of an organizer of the cloud computing project and at least one topic. In one example, the specification further includes at least one role for the cloud computing project and/or at least one participant for the cloud computing project other than the organizer. In one example, the specification may alternatively or additionally include one or more computing resources for the cloud computing project. In one example, the at least one topic may be inferred for the specification from the graph based on the identity of the organizer (e.g., by looking at the highest value topics in a user profile, and/or based upon link/edge weights between a node associated with the organizer and nodes of one or more topics, or the like). In other words, topics may be contained in a metadata/profile of a user node for the organizer, or can be identified from topic nodes that are linked to the user node for the organizer. In other words, if the topic is blank when the specification is input by the organizer, one or more topics can be added to the specification automatically based on the identity of the user and the typical/most associated topic(s).

At step 330, the processing system applies the specification as input(s) to a graph neural network implemented by the processing system. In one example, the graph neural network is associated with a graph having nodes associated with entities comprising: users and computing resources. The graph may further have edges comprising relationships between the entities. It should be noted that the relationships between entities may include relationships between the organizer and others of the users comprising at least one collaboration on at least one past cloud computing project. In one example, the relationships between entities may further include a use by the user of one or more of the computing resources on at least one past cloud computing project. In addition, the graph neural network may be configured to output a recommended set of resources for the cloud computing project, where the recommended set of resources includes at least one recommended computing resource and at least one recommended participant. In one example, the graph neural network is trained using training examples comprising records of completed cloud computing projects, such as described above in connection with optional step 310. As also noted above, the at least one recommended computing resource may comprise at least one of a hardware resource, a non-hardware capacity, or a software resource.

At step 340, the processing system provides a notification of the recommended set of resources to the organizer, e.g., to an endpoint device being used by the organizer to communicate with the processing system in order to input the specification, to obtain the recommended set of resources, and so forth.

At optional step 350, the processing system obtains a selection of the organizer, e.g., for an initial set of resources that includes at least a first participant and at least one computing resource. Either or both of the at least the first participant and the at least one computing resource may be of the recommended set of resources. However, in one example, either or both of the at least the first participant and the at least one computing resource may not be in the recommended set of resources. For instance, the organizer may ignore all or part of the recommended set of resources to choose one or more alternative or additional resources.

At step 360, the processing system provides an initial set of computing resources for the cloud computing project in accordance with a selection of the organizer, where the initial set of computing resources comprises at least one computing resource. For instance, step 360 may include provisioning hardware resources, e.g., via a scheduler, an SDN controller, or the like, which may communicate with various hardware nodes to designate hardware resources for the cloud computing project and the users/participants thereof and/or their designated devices. In addition, step 360 may include populating the hardware resources with various software resources, containers and/or VMs, data sets, programs/applications, visualization tools, GUIs, templates, etc. In one example, step 360 may further include assigning bandwidth/reservation allotments, priority/quality of service designations, etc., e.g., via notification to routers or one or more other network elements, and so forth.

At optional step 370, the processing system may transmit a notification to at least a first participant included in an initial set of resources in accordance with the selection of the organizer. For instance, the initial set of resources may include the at least the first participant and the initial set of computing resources. In one example, the at least the first participant may comprise the at least one recommended participant. However, in another example, the at least the first participant may be a different participant that may be selected by the organizer. For instance, the organizer may ignore part of the recommended set of resources, or may add another participant beyond the recommended set of resources. Alternatively, or in addition, the at least the first participant may further comprise at least a second participant included in the specification. In one example, optional step 370 may include providing a notification, such as via text message, email, or the like, indicating that the at least the first participant has been assigned to the cloud computing project. In one example, an access token may be provided to the at least the first participant (e.g., to the endpoint device thereof), to enable access to one or more of the computing resources allocated to the cloud computing project. Alternatively, or in addition, authorization and access may be obtained based upon a credential already possesses by the at least the first user, e.g., a user account identity assigned by an organization may enable such access.

At optional step 380, the processing system may obtain a final set of resources for the cloud computing project. For instance, the processing system may continue to monitor the cloud computing project and/or receive updates from one or more resources of the cloud computing project indicative of the actual resources that were used to effect project completion (or for an ongoing project, such as a deployed cloud application/platform, after a designated period of time and/ or after the organizer indicates that the project has progressed beyond a development mode into a deployment mode, or the like). As noted above, for each project, the final set of resources may be different than the recommended and/or the initial set of resources. In one example, the processing system may create or update a record for the cloud computing project that indicates the final set of resources used.

At optional step 390, the processing system may retrain the graph neural network. For instance, the retraining of the optional step 390 may be in accordance with a plurality of additional records including a record for the cloud computing project that identifies the final set of resources. In one example, optional step 390 may comprise the same or similar operations as described above in connection with optional step 310. In one example, optional step 390 may include updating the graph/graph database to account for the new/additional relationships indicated by the record (and/or by the plurality of records, if being applied in batch).

Following step 360 or any one or more of optional steps 370-390, the method 300 proceeds to step 395 where the method 300 ends.

It should be noted that the method 300 may be expanded to include additional steps, or may be modified to replace steps with different steps, to combine steps, to omit steps, to perform steps in a different order, and so forth. For instance, in one example the processing system may repeat one or more steps of the method 300, such as steps 320-360, steps 320-390, etc. for additional projects of a same or a different organizer, and so forth. In one example, the method 300 may be modified or expanded to include obtaining a selection of the organizer of at least a portion of the resources, e.g., at optional step 350, and then reapplying as an updated specification for the cloud computing project and obtaining a new set of recommendations (e.g., in accordance with steps 330 and 340), obtaining a new selection of the organizer (e.g., in accordance with optional step 350), etc. In such an example, the initial set of resources provided at step 360 may be in accordance with the new selection of the organizer. In one example, the method 300 may be expanded to include providing recommendations for changing the set of resources, e.g., for an ongoing project as various parameters change, such as the project being re-scoped. For instance, a new specification may indicate the changes, and one or more other changes in the set of resources may be recommended via repetition of the steps of the method 300 (e.g., steps 330-340). In one example, the method 300 may be expanded or modified to include steps, functions, and/or operations, or other features described above in connection with the example(s) of FIGS. 1 and 2, or as described elsewhere herein. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method(s) can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

Figure 4:
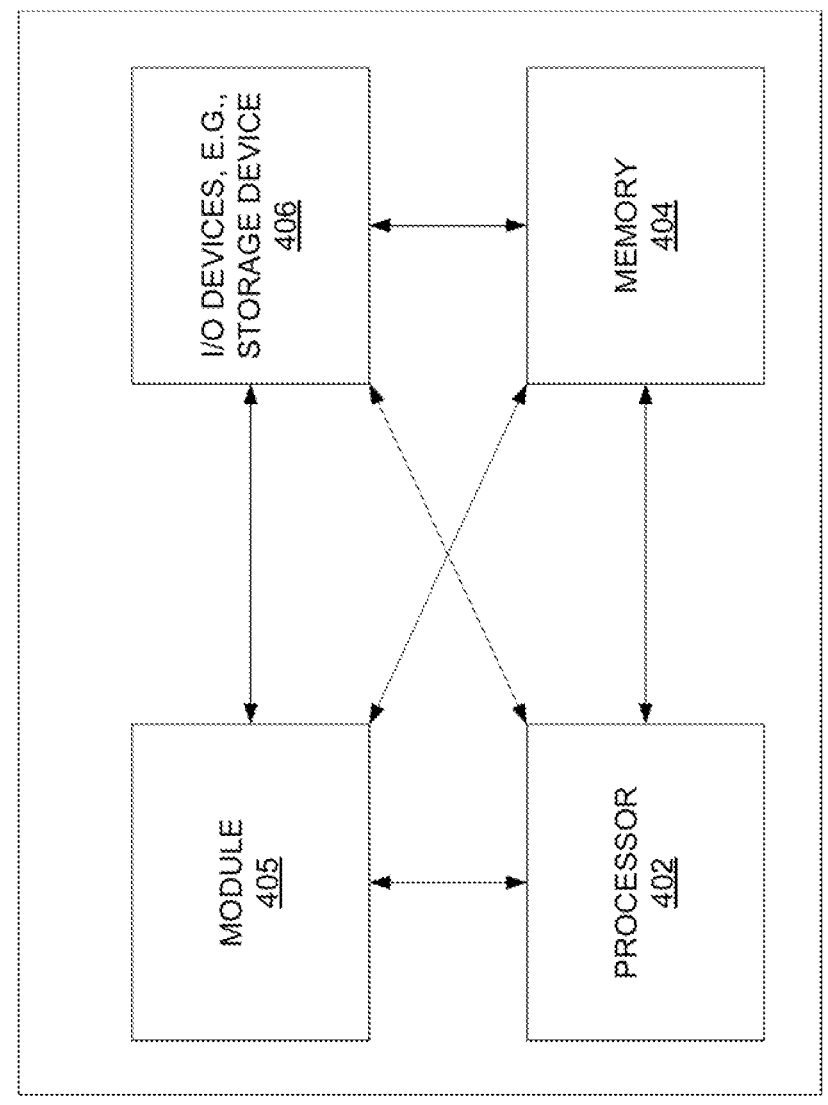
FIG. 4 illustrates a high level block diagram of a computing device specifically programmed to perform the steps, functions, blocks, and/or operations described herein.

FIG. 4 depicts a high-level block diagram of a computing device or processing system specifically programmed to perform the functions described herein. For example, any one or more components or devices illustrated in FIG. 1 or described in connection with the example method 300 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for providing a recommended set of computing resources for a cloud computing project using a graph neural network, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for providing a recommended set of computing resources for a cloud computing project using a graph neural network (e.g., a software program comprising computer-executable instructions) can be loaded into memory 404 and executed by hardware processor element 402 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for providing a recommended set of computing resources for a cloud computing project using a graph neural network (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:

obtaining, by a processing system including at least one processor, a specification for a cloud computing project, the specification including an identity of an organizer of the cloud computing project and at least one topic;

applying, by the processing system, the specification as inputs to a graph neural network implemented by the processing system, the graph neural network comprising a graph, the graph having nodes associated with entities comprising: users and computing resources, the graph having edges comprising relationships between the entities, and the graph neural network further comprising a convolutional neural network configured to output a recommended set of resources for the cloud computing project in response to an input comprising an embedding from the graph based on nodes associated with the organizer and the at least one topic, wherein the recommended set of resources includes: at least one recommended computing resource of a recommended computing resource type of a recommended cloud service provider network and at least one recommended participant, wherein the graph neural network is trained using training examples comprising records of completed cloud computing projects, and wherein the records include final sets of resources used for the completed cloud computing projects;

providing, by the processing system, a notification of the recommended set of resources to the organizer;

provisioning, by the processing system, an initial set of computing resources for the cloud computing project, wherein the initial set of computing resources comprises at least one hardware resource, wherein the at least one hardware resource is of the recommended computing resource type of the recommended cloud service provider network, wherein the at least one hardware resource comprises a network function virtualization infrastructure, and wherein the network function virtualization infrastructure comprises at least one of: a central processing unit, a graphics processing unit, a memory, or a storage;

obtaining, by the processing system, a final set of computing resources for the cloud computing project; and retraining, by the processing system, the graph neural network, wherein the retraining is in accordance with a plurality of additional records including a record for the cloud computing project that identifies a discrepancy between the initial set of computing resources and the final set of computing resources.

2. The method of claim 1, wherein the specification further includes:

at least one role for the cloud computing project; or at least one participant for the cloud computing project other than the organizer.

3. The method of claim 1, further comprising:

transmitting a notification to at least a first participant included in an initial set of resources in accordance with a selection of the organizer, wherein the initial set of resources includes the at least the first participant and the initial set of computing resources.

4. The method of claim 3, wherein the at least the first participant comprises the at least one recommended participant.

5. The method of claim 4, wherein the at least the first participant further comprises at least a second participant included in the specification.

6. The method of claim 1, wherein each of the records further includes information comprising:

an identity of a respective project organizer of a respective completed cloud computing project; and one or more topics of the respective completed cloud computing project.

7. The method of claim 1, further comprising:

training the graph neural network with the training examples.

8. The method of claim 1, wherein the initial set of computing resources further comprises at least one of:

a non-hardware capacity; or a software resource.

9. The method of claim 1, wherein the at least one recommended computing resource comprises at least one of:

the at least one hardware resource;

a non-hardware capacity; or a software resource.

10. The method of claim 1, further comprising:

obtaining a selection of the organizer.

11. The method of claim 10, wherein the selection of the organizer includes a selection of the initial set of computing resources and a selection of at least a first participant.

12. The method of claim 1, wherein the relationships between the entities include relationships between the organizer and others of the users comprising at least one collaboration on at least one past cloud computing project.

13. The method of claim 12, wherein the relationships between the entities further include a use by the organizer of one or more of the computing resources on at least one past cloud computing project.

14. The method of claim 1, wherein the entities further comprise topics that include the at least one topic.

15. The method of claim 1, wherein the at least one topic is inferred for the specification from the graph based on the identity of the organizer.

16. The method of claim 1, wherein the convolutional neural network comprises:

a graph convolutional network.

17. A non-transitory computer-readable medium storing instructions which, when executed by a processing system including at least one processor, cause the processing system to perform operations, the operations comprising:

obtaining a specification for a cloud computing project, the specification including an identity of an organizer of the cloud computing project and at least one topic;

applying the specification as inputs to a graph neural network implemented by the processing system, the graph neural network comprising a graph, the graph having nodes associated with entities comprising: users and computing resources, the graph having edges comprising relationships between the entities, and the graph neural network further comprising a convolutional neural network configured to output a recommended set of resources for the cloud computing project in response to an input comprising an embedding from the graph based on nodes associated with the organizer and the at least one topic, wherein the recommended set of resources includes: at least one recommended computing resource of a recommended computing resource type of a recommended cloud service provider network and at least one recommended participant, wherein the graph neural network is trained using training examples comprising records of completed cloud computing projects, and wherein the records include final sets of resources used for the completed cloud computing projects;

providing a notification of the recommended set of resources to the organizer;

provisioning an initial set of computing resources for the cloud computing project, wherein the initial set of computing resources comprises at least one hardware resource, wherein the at least one hardware resource is of the recommended computing resource type of the recommended cloud service provider network, wherein the at least one hardware resource comprises a network function virtualization infrastructure, and wherein the network function virtualization infrastructure comprises at least one of: a central processing unit, a graphics processing unit, a memory, or a storage;

obtaining a final set of computing resources for the cloud computing project; and retraining the graph neural network, wherein the retraining is in accordance with a plurality of additional records including a record for the cloud computing project that identifies a discrepancy between the initial set of computing resources and the final set of computing resources.

18. An apparatus comprising:

a processing system including at least one processor; and a non-transitory computer-readable medium storing instructions which, when executed by the processing system, cause the processing system to perform operations, the operations comprising:

obtaining a specification for a cloud computing project, the specification including an identity of an organizer of the cloud computing project and at least one topic;

applying the specification as inputs to a graph neural network implemented by the processing system, the graph neural network comprising a graph, the graph having nodes associated with entities comprising: users and computing resources, the graph having edges comprising relationships between the entities, and the graph neural network further comprising a convolutional neural network configured to output a recommended set of resources for the cloud computing project in response to an input comprising an embedding from the graph based on nodes associated with the organizer and the at least one topic, wherein the recommended set of resources includes: at least one recommended computing resource of a recommended computing resource type of a recommended cloud service provider network and at least one recommended participant, wherein the graph neural network is trained using training examples comprising records of completed cloud computing projects, and wherein the records include final sets of resources used for the completed cloud computing projects;

providing a notification of the recommended set of resources to the organizer;

provisioning an initial set of computing resources for the cloud computing project, wherein the initial set of computing resources comprises at least one hardware resource, wherein the at least one hardware resource is of the recommended computing resource type of the recommended cloud service provider network, wherein the at least one hardware resource comprises a network function virtualization infrastructure, and wherein the network function virtualization infrastructure comprises at least one of: a central processing unit, a graphics processing unit, a memory, or a storage;

obtaining a final set of computing resources for the cloud computing project; and retraining the graph neural network, wherein the retraining is in accordance with a plurality of additional records including a record for the cloud computing project that identifies a discrepancy between the initial set of computing resources and the final set of computing resources.

19. The apparatus of claim 18, wherein the specification further includes:

at least one role for the cloud computing project; or at least one participant for the cloud computing project other than the organizer.

20. The apparatus of claim 18, the operations further comprising:

transmitting a notification to at least a first participant included in an initial set of resources in accordance with a selection of the organizer, wherein the initial set of resources includes the at least the first participant and the initial set of computing resources.

\* \* \* \* \*